US012613797B2

(12) United States Patent
Song et al.

(10) Patent No.: US 12,613,797 B2
(45) Date of Patent: Apr. 28, 2026

(54) METHOD FOR MEMORY ID ALLOCATION, MEMORY, MEMORY MODULE, AND MEMORY SYSTEM

(71) Applicant: SK hynix Inc., Icheon-si (KR)

(72) Inventors: Choung Ki Song, Icheon-si (KR); Kyung Whan Kim, Icheon-si (KR); Min Su Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 5 days.

(21) Appl. No.: 18/659,526

(22) Filed: May 9, 2024

(65) Prior Publication Data

US 2024/0378143 A1 Nov. 14, 2024

(30) Foreign Application Priority Data

| | | |
|---|---|---|
| May 10, 2023 | (KR) | 10-2023-0060665 |
| Jun. 1, 2023 | (KR) | 10-2023-0070633 |
| Feb. 5, 2024 | (KR) | 10-2024-0017357 |

(51) Int. Cl.
G06F 12/00 (2006.01)
G06F 3/06 (2006.01)
G06F 12/02 (2006.01)

(52) U.S. Cl.
CPC .......... G06F 12/023 (2013.01); G06F 3/0659 (2013.01)

(58) Field of Classification Search
None
See application file for complete search history.

(56) References Cited

U.S. PATENT DOCUMENTS

| | | | |
|---|---|---|---|
| 2001/0028114 A1* | 10/2001 | Hosomi | G11C 8/12 |
| | | | 257/778 |
| 2022/0406368 A1 | 12/2022 | Jung et al. | |
| 2024/0028769 A1* | 1/2024 | Taveira | G06F 21/1014 |

FOREIGN PATENT DOCUMENTS

KR 1020150037043 A 4/2015

* cited by examiner

*Primary Examiner* — Daniel D Tsui
(74) *Attorney, Agent, or Firm* — WILLIAM PARK AND ASSOCIATES LTD.

(57) ABSTRACT

A memory module may include a management bus and a plurality of memories connected in series and connected to the management bus, each of the plurality of memories including an identification (ID) input terminal and an ID output terminal. Among the plurality of memories, a memory, for which an activation signal is applied to an ID input terminal of the memory, may set an ID for the memory in response to ID setting information transmitted on the management bus.

12 Claims, 9 Drawing Sheets

Manage-BUS ——▷ 830

IDi ——▷ 810

DECODING CIRCUIT 840

▷ 820 — IDo

ID SETTING CIRCUIT 850 — ID <0:3>

METHOD FOR MEMORY ID ALLOCATION, MEMORY, MEMORY MODULE, AND MEMORY SYSTEM

CROSS-REFERENCE TO RELATED APPLICATION

This application claims priority under 35 U.S.C. § 119(a) to Korean Patent Application No. 10-2023-0060665 filed on May 10, 2023, Korean Patent Application No. 10-2023-0070633 filed on Jun. 1, 2023, and Korean Patent Application No. 10-2024-0017357 filed on Feb. 5, 2024, in the Korean Intellectual Property Office, which applications are incorporated herein by reference in their entirety.

BACKGROUND

1. Technical Field

Embodiments of the present disclosure relate to a memory and a memory system including the same.

2. Related Art

Memory systems may include various types of memory modules. The memory module may be constituted by a single memory, but is generally constituted by a plurality of memories for high-capacity and high-speed processing.

Each memory in the memory module mainly performs the same operation. For example, when one memory module includes eight memories, read and write operations may be simultaneously performed on the eight memories.

SUMMARY

In an embodiment, a memory module may include a management bus and a plurality of memories connected in series and connected to the management bus, each of the plurality of memories including an identification (ID) input terminal and an ID output terminal, wherein among the plurality of memories, a memory, for which an activation signal is applied to an ID input terminal of the memory, sets an ID for the memory in response to ID setting information transmitted on the management bus.

In an embodiment, a method for memory ID allocation may include receiving from a management bus, by a first memory, a second memory, a third memory, and a fourth memory, information to set IDs to a first value; setting, by the first memory, an ID for the first memory to the first value after an activation signal is input to an ID input terminal of the first memory; outputting, by the first memory, the activation signal to an ID output terminal of the first memory, wherein the ID output terminal of the first memory is electrically connected to an ID input terminal of the second memory; receiving from the management bus, by the first memory, the second memory, the third memory, and the fourth memory, information to set the IDs to a second value; setting, by the second memory having an unset ID, an ID for the second memory to the second value after the activation signal is input to an ID input terminal of the second memory; and outputting, by the second memory, the activation signal to an ID output terminal of the second memory, wherein the ID output terminal of the second memory is electrically connected to an ID input terminal of the third memory.

In an embodiment, a memory system may include a command address bus; a plurality of data buses; a management bus; a plurality of memories connected in series, commonly connected to the management bus, commonly connected to the command address bus, and connected to corresponding data buses among the plurality of data buses, and wherein each of the plurality of memories includes an identification (ID) input terminal and an ID output terminal; a memory controller connected to the plurality of memories through the command address bus and the plurality of data buses; and a baseboard management controller connected to the plurality of memories through the management bus, wherein an activation signal is input to an ID input terminal of a memory among the plurality of memories, and the memory sets an ID for the memory in response to ID setting information transmitted by the baseboard management controller on the management bus.

In an embodiment, a memory module may include a plurality of memories, wherein each of the plurality of memories may include: a plurality of identification (ID) input terminals; a plurality of ID output terminals; and an arithmetic circuit that generates, based a value input to the plurality of ID input terminals, a value output to the plurality of ID output terminals, wherein for a memory of the plurality of memories, an ID for the memory is set as the value input to the plurality of ID input terminals for the memory.

In an embodiment, a memory may include a plurality of identification (ID) input terminals; a plurality of ID output terminals; an ID setting circuit that sets, as an ID for the memory, a value input to the ID input terminals; and an arithmetic circuit that generates, based on the value input to the ID input terminals, a value output to the ID output terminals.

In an embodiment, a memory may include a plurality of first identification (ID terminals); a plurality of second ID terminals; an ID setting circuit that sets, as an ID for the memory, a value input to the first ID terminals in a first mode and sets, as the ID for the memory, a value input to the second ID terminals in a second mode; and an arithmetic circuit that generates, based on the value input to the first ID input terminals, a value output to the second ID terminals in the first mode, and generates, based on the value input to the second ID terminals, a value output to the first ID terminals in the second mode.

In an embodiment, a method for memory ID allocation may include setting, by a first memory, a value input to an ID input terminal of the first memory as an ID for the first memory; generating based on the value input to the ID input terminal of the first memory, by the first memory, a value output to an ID output terminal of the first memory; setting, by a second memory, a value input to an ID input terminal of the second memory as an ID for the second memory, wherein the ID input terminal of the second memory is electrically connected to the ID output terminal of the first memory; and generating based on the value input to the ID input terminal of the second memory, by the second memory, a value output to an ID output terminal of the second memory.

In an embodiment, a memory module may include a management bus and a plurality of memories connected to the management bus; wherein an identification (ID) output terminal of a memory of the plurality of memories is connected to an ID input terminal of a following memory of the plurality of memories such that the plurality of memories are connected in series; and wherein, when an activation signal is applied to an ID input terminal of the memory, the memory sets an ID for the memory in response to ID setting information transmitted on the management bus and provides an output signal to the ID output terminal such that the output signal affects setting an ID for the following memory.

BRIEF DESCRIPTION OF THE DRAWINGS

FIG. 3 is a configuration diagram of an embodiment of a memory.

FIG. 8 is a configuration diagram of another embodiment of a memory.

DETAILED DESCRIPTION

Because memories in the memory module have differences in location, wiring length, or the like, the memories need to distinguish the differences in order to independently operate more efficiently. Various embodiments are directed to providing a configuration and a method for allocating an identifier (ID) for distinguishing memories.

According to embodiments, mutually exclusive or different identifiers (IDs) can be allocated to memories.

Embodiments in accordance with the technical spirit of the present disclosure are described with reference to the accompanying drawings.

Figure 1:
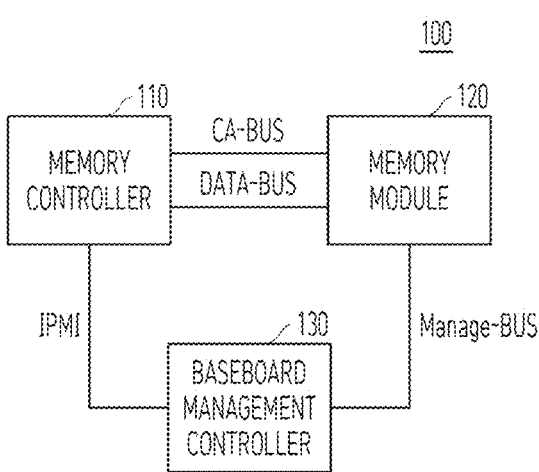
FIG. 1 is a configuration diagram of a memory system in accordance with an embodiment of the present disclosure.

FIG. 1 is a configuration diagram of a memory system in accordance with an embodiment of the present disclosure.

Referring to FIG. 1, the memory system 100 includes a memory controller 110, a memory module 120, and a baseboard management controller 130.

The memory controller 110 controls operation of the memory module 120. The memory controller 110 may be included in a processor such as a central processing unit (CPU), a graphics processing unit (GPU), or an application processor (AP). The memory controller 110 transmits commands and addresses to the memory module 120 through a command address bus CA-BUS and transmits data to and receives data from the memory module 120 through the data bus DATA-BUS.

The memory module 120 performs a read operation, a write operation, and the like under the control of the memory controller 110. The memory module 120 performs operations indicated by the commands and the addresses transmitted through the command address bus CA-BUS, transmits data to the memory controller 110 through the data bus DATA-BUS during a read operation, and receives data transmitted from the memory controller 110 through the data bus DATA-BUS during a write operation.

The baseboard management controller (BMC) 130 is, for example, a device mounted on a baseboard of a device such as a server or a PC to perform management and monitoring functions. The baseboard management controller 130 communicates with the memory module 120, manage the memories, also known as memory devices, within the memory module 120, and communicates with the memory controller 110 to check the state of the system, manage the system, or diagnose problems. For communication between the baseboard management controller 130 and the memory controller 110, an interface 131 referred to as an intelligent platform management interface (IPMI) may be used. Communication between the baseboard management controller 130 and the memory module 120 is performed through a management bus Manage-BUS. The management bus Manage-BUS uses a memory module management control (M3C) interface similar to an inter-integrated circuit (I2C) interface.

Because the command address bus CA-BUS and the data bus DATA-BUS between the memory controller 110 and the memory module 120 are buses that perform the main or common functions of the memory module 120, these interfaces are referred to as in-band interfaces. Because the management bus Manage-BUS between the baseboard management controller 130 and the memory module 120 is a bus used for additional control or management of the memory module 120, this interface is referred to as a side-band interface.

Figure 2:
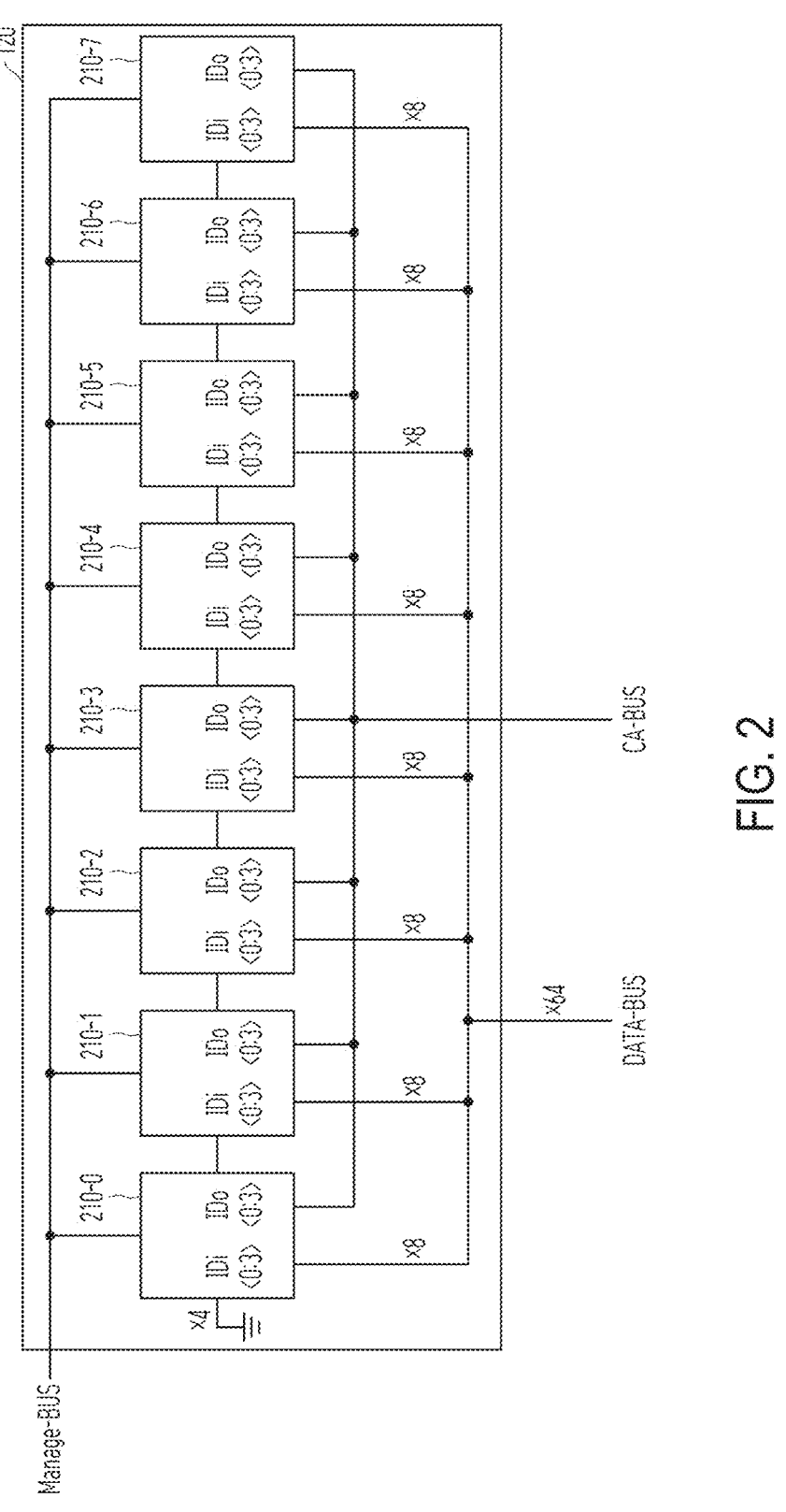
FIG. 2 is a configuration diagram of an embodiment of a memory module.

FIG. 2 is a configuration diagram of an embodiment of the memory module.

Referring to FIG. 2, the memory module 120 includes a plurality of memories 210-0 to 210-7, including memories 210-0, 210-1, 210-2, 210-3, 210-4, 210-5, 210-6, and 210-7.

The command address bus CA-BUS is commonly connected to the memories 210-0 to 210-7. Accordingly, the memories 210-0 to 210-7 receive the same commands and addresses from the memory controller 110.

The data bus DATA-BUS is distributed and connected to the memories 210-0 to 210-7. When the data bus DATA-BUS between the memory controller 110 and the memory module 120 is a 64-bit bus, the data buses DATA-BUS are distributed and connected to the memories 210-0 to 210-7 by 8-bit lines. Accordingly, each of the memories 210-0 to 210-7 may transmit mutually exclusive or different data to and receive mutually exclusive or different data from the memory controller 110.

The management bus Manage-BUS is commonly connected to the memories 210-0 to 210-7. One of the advantages of using the management bus Manage-BUS, which is a side-band interface, is to set the IDs of the memories 210-0 to 210-7 through the management bus Manage-BUS before the memory system 100 is powered up and the command address bus CA-BUS and data bus DATA-BUS are available due to their nature as in-band interfaces.

Because the locations and wiring lengths of the memories 210-0 to 210-7 within the memory module 120 are different, independent settings may be utilized for each of the memories 210-0 to 210-7. An identifier (ID) is utilized to distinguish the memories 210-0 to 210-7 from one another.

As a method for allocating mutually exclusive or different IDs to memories, per DRAM addressability (PDA) may be used to enumerate ID programming supported in a PDA mode. Because the PDA mode uses a command address bus, such as command address bus CA-BUS, and a data bus, such as data bus DATA-BUS, that are in-band interfaces, the PDA mode might not be capable of independently setting ID values for memories through the management bus Manage-BUS before power-up that enables normal operation of a memory controller.

In order to allocate mutually exclusive or different IDs to the memories 210-0 to 210-7 without using the in-band interface, ID input terminals IDi and ID output terminals IDo are provided to the memories 210-0 to 210-7 and are connected in series. For example, the ID output terminals Ido<0:3> of the memory 210-1 are connected to the ID input terminals IDi<0:3> of the memory 210-2, and the ID output terminals Ido<0:3> of the memory 210-2 are connected to the ID input terminals Idi<0:3> of the memory 210-3, which connections may be referred to as daisy chain connections. Thus, when memories are referred to as connected in series, the ID output terminals of one memory are connected in series to the ID input terminals of a following or consecutive memory in the series chain of memories In FIG. 2, <0:3> (identified as 0, 1, 2, and 3) indicates that the quantity of ID input terminals IDi is four (4) and the quantity of ID output terminals Ido is four (4). The quantity of terminals may be different from four as shown the example. A fixed voltage may be connected to the ID input terminals IDi of the first memory 210-0 among the memories 210-0 to 210-7 connected in series. For example, a ground voltage may be connected to all four ID input terminals IDi of the memory 210-0.

The type of the memory module 120 may be dual in-line memory module (DIMM) or may be one of other types of form factors such as add-in card (AIC) and enterprise and data center SSD form factor (EDSFF).

Figure 3:
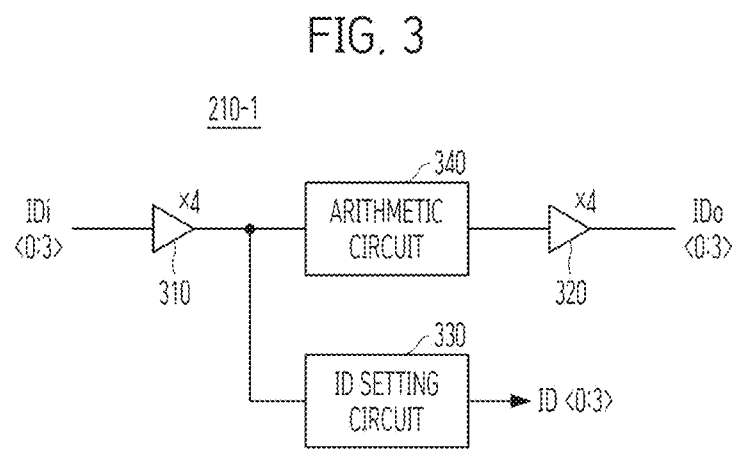

FIG. 3 is a configuration diagram of an embodiment of the memory, such as the memory 210-1 in FIG. 2. FIG. 3 illustrates a configuration related to ID assignment in, for example, the memory 210-1. The other memories 210-0, 210-2, 210-3, 210-4, 210-5, 210-6, and 210-7 may be configured in the same way as the memory 210-1.

Referring to FIG. 3, the memory 210-1 includes ID receivers 310, ID transmitters 320, an ID setting circuit 330, and an arithmetic circuit 340.

The ID receivers 310 receive signals from the ID input terminals IDi<0:3>. Because the quantity of ID input terminals IDi<0:3> is four, the quantity of ID receivers 310 is also four.

The ID setting circuit 330 sets the signals from the ID input terminals IDi<0:3> received through the ID receivers 310 as an ID ID<0:3> for the memory 210-1. The ID ID<0:3> may be set by the ID setting circuit 330 in synchronization with a signal input from outside of the memory 210-1. For example, the ID setting circuit 330 may be configured to set, as the ID ID<0:3>, signals input at a time when a reset signal input from outside of the memory 210-1 transitions from a low level to a high level, thus the ID setting circuit 330 may operate in synchronization with the reset signal input from outside of the memory 210-1. The ID receivers 310 are configured to be deactivated after the ID ID<0:3> is set by the ID setting circuit 330.

The arithmetic circuit 340 generates output signals that are transmitted to the ID output terminals IDo<0:3>. The arithmetic circuit 340 generates the output signals based on signals received from the ID receivers 310, which signals are provided from the ID input terminals IDi<0:3> to the ID receivers 310. The arithmetic circuit 340 may be an adder and generates a value output by adding a specific value, for example, 1, to an input value.

The signals generated by the arithmetic circuit 340 are output to the ID transmitters 320. The ID transmitters 320 output the values generated by the arithmetic circuit 340 to the ID output terminals IDo<0:3>.

Through the configurations illustrated in FIG. 3, the memory 210-1 sets a value input to the ID input terminals IDi<0:3> as the ID ID<0:3> of the memory 210-1 and outputs a value obtained by adding +1 to the input value to the ID output terminals IDo<0:3>.

Referring to FIG. 2 and FIG. 3, the memory 210-0 sets "0", which is the value input to ID input terminals IDi of the memory 210-0, as an ID for the memory 210-0, and outputs "1" to the ID output terminals IDo. The memory 210-1 sets "1", which is the value input to ID input terminal IDi of the memory 210-1, as an ID for the memory 210-1, and outputs "2" to the ID output terminals IDo. In the same way, the ID for the memory 210-2 is set to "2", the ID for the memory 210-3 is set to "3", the ID for the memory 210-4 is set to "4", the ID for the memory 210-5 is set to "5", the ID for the memory 210-6 is set to "6", and the ID for the memory 210-7 is set to "7".

Figure 4:
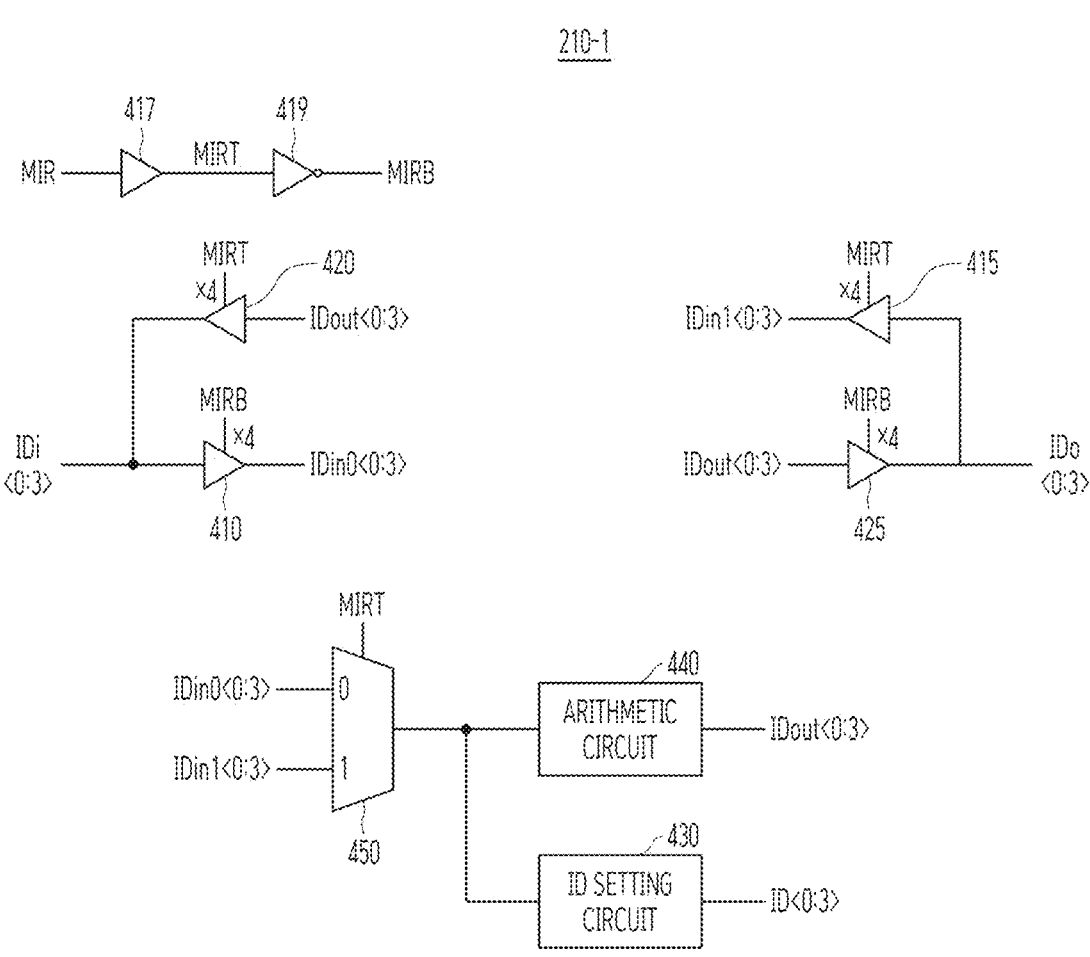
FIG. 4 is a configuration diagram of another embodiment of a memory.

FIG. 4 is a configuration diagram of another embodiment of the memory, such as memory 210-1 in FIG. 2. FIG. 4 illustrates a configuration related to ID assignment in, for example, the memory 210-1. The other memories 210-0, 210-2, 210-3, 210-4, 210-5, 210-6, and 210-7 may be configured in the same way as the memory 210-1. Compared to the memory 210-1 in FIG. 3, the memory 210-1 in FIG. 4 further performs a function including facilitating interchange of the ID input terminals IDi and the ID output terminals IDo.

Referring to FIG. 4, the memory 210-1 includes first ID receivers 410, second ID receivers 415, first ID transmitters 420, second ID transmitters 425, a mirroring signal receiver 417, an inverter 419, a selection circuit 450, an ID setting circuit 430, and an arithmetic circuit 440.

The mirroring signal receiver 417 receives a mirroring signal MIR input from outside of the memory 210-1. The mirroring signal MIR may be a signal transmitted from another device in the memory module 120 or a device outside the memory module 120, or a signal generated when an input terminal of the mirroring signal receiver 417 is connected to a ground voltage or a power supply voltage on a substrate of the memory module 120. The mirroring signal receiver 417 outputs a first mirroring signal MIRT based on the mirroring signal MIR. The inverter 419 inverts the first mirroring signal MIRT to generate a second mirroring signal MIRB. When the first mirroring signal MIRT is activated and the second mirroring signal MIRB is deactivated, the memory 210 operates in a reverse mode, and when the first mirroring signal MIRT is deactivated and the second mirroring signal MIRB is activated, the memory 210 operates in a forward mode.

The first ID receivers 410 receive signals from the first ID terminals IDi<0:3>. The first ID receivers 410 are activated in a forward mode when the second mirroring signal MIRB is activated. Because the quantity of first ID terminals IDi<0:3> is four, the quantity of first ID receivers 410 is also four.

The second ID receivers 415 receive signals from the second ID terminals IDo<0:3>. The second ID receivers 415 are activated in a reverse mode when the first mirroring signal MIRT is activated. Because the quantity of second ID terminals IDo<0:3> is four, the quantity of second ID receivers 415 is also four. The terminals IDi<0:3> are referred to as first ID terminals, and the terminals IDo<0:3> are referred to as second ID terminals because, in the embodiment of FIG. 4, the input terminals and the output terminals are not fixed as inputs or outputs and change depending on the mode.

In the forward mode in which the first mirroring signal MIRT is deactivated, the selection circuit 450 selects and output signals IDin0<0:3> received from the first ID receivers 410, and in the reverse mode in which the first mirroring signal MIRT is activated, the selection circuit 450 selects and output signals IDin1<0:3> received from the second ID receivers 415.

The ID setting circuit 430 sets signals selected by the selection circuit 450 as the ID ID<0:3> of the memory 210-1. In the forward mode, the signals IDin0<0:3> input to the first ID terminals IDi<0:3> are set as the ID ID<0:3>, and in the reverse mode, the signals IDin1<0:3> input to the second ID terminals IDo<0:3> are set as the ID ID<0:3>. The ID ID<0:3> may be set by the ID setting circuit 430 in synchronization with a signal input from outside of the memory 210-1. For example, the ID setting circuit 430 may be configured to set, as the ID ID<0:3>, signals input at a time when a reset signal input from outside of the memory 210-1 transitions from a low level to a high level, thus the ID setting circuit 330 may operate in synchronization with the reset signal input from outside of the memory 210-1.

The arithmetic circuit 440 generates output signals IDout<0:3> from signals selected by the selection circuit 450. The arithmetic circuit 440 may be an adder and generates a value output by adding a specific value, for example 1, to an input value.

The first ID transmitters 420 transmit the output signals IDout<0:3> from the arithmetic circuit 440 to the first ID terminals Idi<0:3>. The first ID transmitters 420 are activated in a reverse mode when the first mirroring signal MIRT is activated.

The second ID transmitters 425 transmit the output signals Idout<0:3> from the arithmetic circuit 440 to the second ID terminals Ido<0:3>. The second ID transmitters 425 are activated in a forward mode when the second mirroring signal MIRB is activated.

Through the configurations illustrated in FIG. 4, in the forward mode, the memory 210-1 sets a value input to the first ID terminals Idi<0:3> as the ID ID<0:3> of the memory 210-1 and outputs a value obtained by adding +1 to the input value to the second ID terminals Ido<0:3>. In a reverse mode, the memory 210-1 sets a value input to the second ID terminals Ido<0:3> as the ID ID<0:3> of the memory 210-1 and outputs a value obtained by adding +1 to the input value to the first ID terminals Idi<0:3>.

Referring to FIG. 2 and FIG. 4, when the memories 210-0 to 210-7 of the memory module 120 operate in a forward mode, a fixed voltage is connected to the terminals Idi of the memory 210-0 as illustrated in FIG. 2. When the memories 210-0 to 210-7 operate in a reverse mode, a fixed voltage is connected to the terminals Ido of the memory 210-7.

Figure 5:
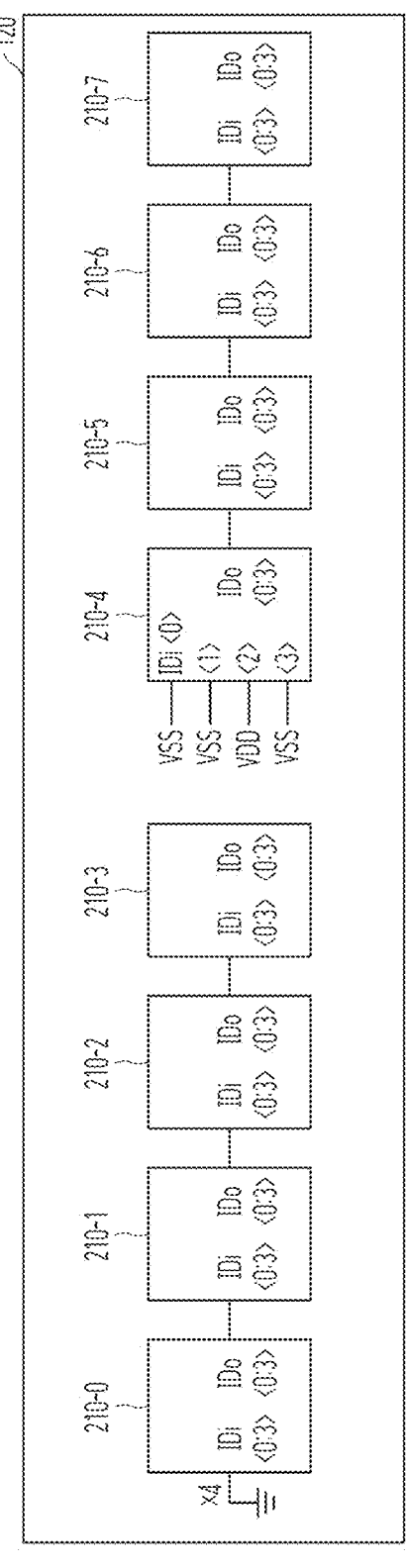
FIG. 5 is a configuration diagram of another embodiment of a memory module.

FIG. 5 is a configuration diagram of another embodiment of the memory module, such as memory module 120 in FIG. 1.

In the embodiment of FIG. 5, an example in which connections between the ID input terminals Idi and the ID output terminals Ido of the memories 210-0 to 210-7 are different from the connections in the embodiment of FIG. 2 is described. FIG. 5 does not illustrate the buses CA-BUS, DATA-BUS, and Manage-BUS for simplicity of the drawing.

Referring to FIG. 5, the ID input terminals Idi and the ID output terminals Ido of the memories 210-0 to 210-3 in a first group are connected in series, for example, in a daisy chain manner, and the ID input terminals Idi and the ID output terminals Ido of the memories 210-4 to 210-7 in a second group are connected in series, for example, in a daisy chain manner as shown in FIG. 5. Memory 210-3 is not directly connected to memory 210-4 in FIG. 5 in the same way memory 210-3 is directly connected to memory 210-4 in FIG. 2.

A ground voltage VSS is connected to all the ID input terminals Idi of the first memory 210-0 among the memories 210-0 to 210-3, such that the ID for the memory 210-0 is set to "0", and the ground voltage VSS and a power supply voltage VDD are connected to the ID input terminals Idi<0:

3> of the first memory 210-4 among the memories 210-4 to 210-7 as (0,1,0,0), such that the ID for the memory 210-4 is set to "4".

Because the ID for the memory 210-0 is set to "0", the IDs of the memories 210-1, 210-2, and 210-3 are set to "1", "2", and "3", respectively. Because the ID for the memory 210-4 is set to "4", the IDs of the memories 210-5, 210-6, and 210-7 are set to "5", "6", and "7", respectively.

Figure 6:
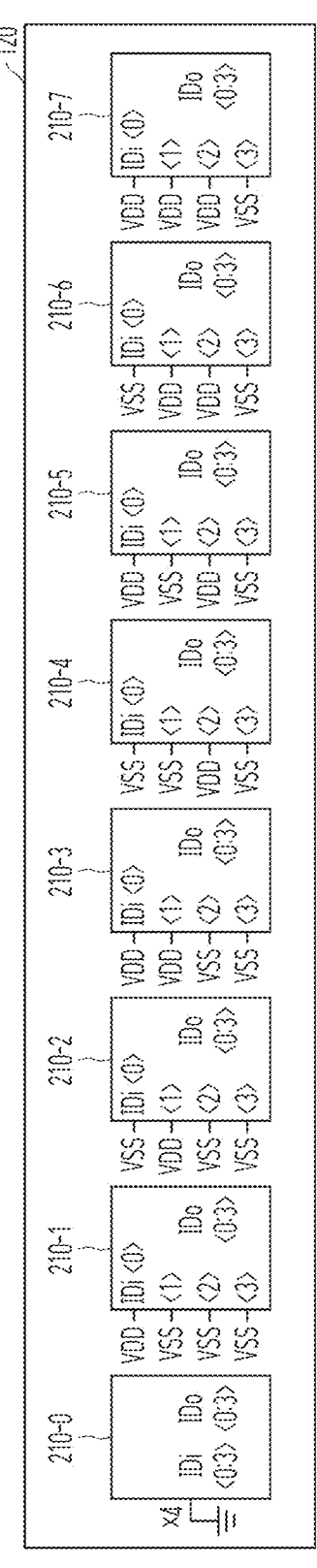
FIG. 6 is a configuration diagram of a further embodiment of a memory module.

FIG. 6 is a configuration diagram of another embodiment of the memory module, such as memory module 120 in FIG. 1.

In the embodiment of FIG. 6, an example in which connections between the ID input terminals Idi and the ID output terminals Ido of the memories 210-0 to 210-7 are different from the connections in the embodiment of FIG. 2 and FIG. 5 is described. FIG. 6 does not illustrate the buses CA-BUS, DATA-BUS, and Manage-BUS.

Referring to FIG. 6, the ground voltage VSS and the power supply voltage VDD are connected to the ID input terminals Idi of the memories 210-0 to 210-7, such that the memories 210-0 to 210-7 are set as mutually exclusive or different IDs. For example, the ground voltage VSS and the power voltage VDD are connected to the ID input terminals Idi<0:3> of the memory 210-2 as (0,0,1,0), such that the ID for the memory 210-2 is set to "2", and the ground voltage VSS and the power supply voltage VDD are connected to the ID input terminals Idi<0:3> of the memory 210-5 as (0,1,0,1), such that the ID for the memory 210-5 is set to "5". Similarly, the ground voltage VSS and the power voltage VDD are connected to the ID input terminals Idi<0:3> of the memories 210-0, 210-1, 210-3, 210-4, 210-6, and 210-7 as (0,0,0,0), (0,0,0,1), (0,0,1,1), (0,1,0,0), (0,1,1,0), and (0,1,1, 1), respectively, such that the ID for each memory 210-0, 210-1, 210-3, 210-4, 210-6, and 210-7 is set to "0", "1", "3, "4", "6", and "7", respectively.

Figure 7:
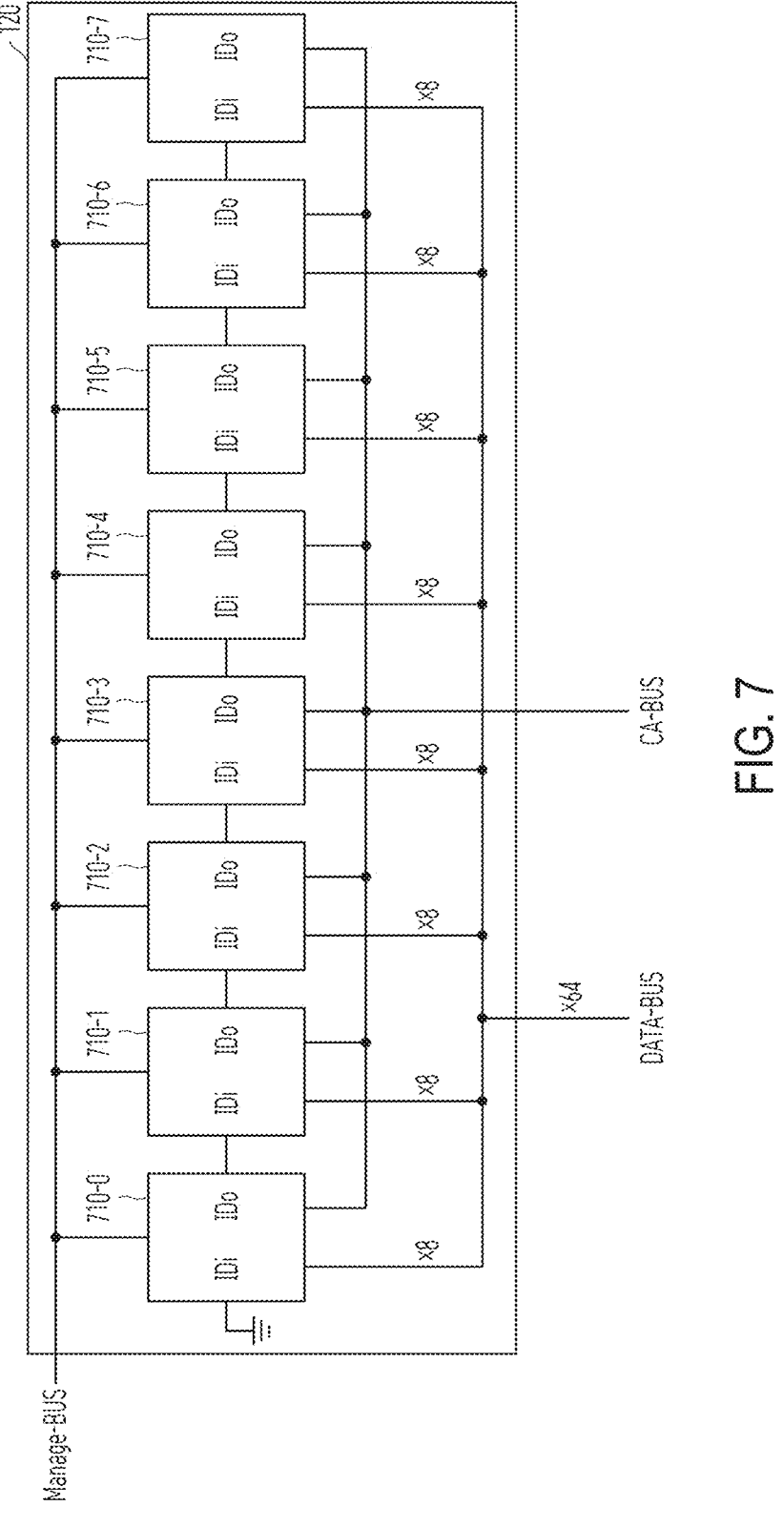
FIG. 7 is a configuration diagram of yet another embodiment of the memory module.

FIG. 7 is a configuration diagram of another embodiment of the memory module, such as memory module 120 in FIG. 1. The memory module of FIG. 7 uses a method for allocating mutually exclusive or different IDs to a plurality of memories 710-0 to 710-7 in a different manner from the methods utilized in the memory modules in FIG. 2, FIG. 5, and FIG. 6.

Referring to FIG. 7, the memory module 120 includes the plurality of memories 710-0 to 710-7.

The command address bus CA-BUS is commonly connected to the memories 710-0 to 710-7. Accordingly, the memories 710-0 to 710-7 receive the same commands and addresses from the memory controller 110.

The data bus DATA-BUS is distributed and connected to the memories 710-0 to 710-7. When the data bus DATA-BUS between the memory controller 110 and the memory module 120 is a 64-bit bus, the data buses DATA-BUS are distributed and connected to the memories 710-0 to 710-7 by 8-bit lines. Accordingly, each of the memories 710-0 to 710-7 may transmit mutually exclusive or different data to and receive mutually exclusive or different data from the memory controller 110.

The management bus Manage-BUS is commonly connected to the memories 710-0 to 710-7. One of the advantages of using the management bus Manage-BUS, which is a side-band interface, is to set the IDs of the memories 710-0 to 710-7 through the management bus Manage-BUS before the memory system 100 is powered up and the command address bus CA-BUS and data bus DATA-BUS are available due to their nature as in-band interfaces.

In order to allocate mutually exclusive or different IDs to the memories 710-0 to 710-7, ID input terminals Idi and ID output terminals Ido are provided to the memories 710-0 to 710-7 and are connected in series. Each of the memories 710-0 to 710-7 uses one ID input terminal Idi and one ID output terminal Ido. A fixed voltage, referred to as a fixed activation voltage or activation signal, is applied to the ID input terminal Idi of the first memory 710-0 among the memories 710-0 to 710-7 connected in series. For example, the ground voltage may be connected to the ID input terminal Idi of the memory 710-0.

The type of the memory module 120 may be dual in line memory module (DIMM) or may be one of other types of form factors such as add-in card (AIC) and enterprise and data center SSD form factor (EDSFF).

Figure 8:
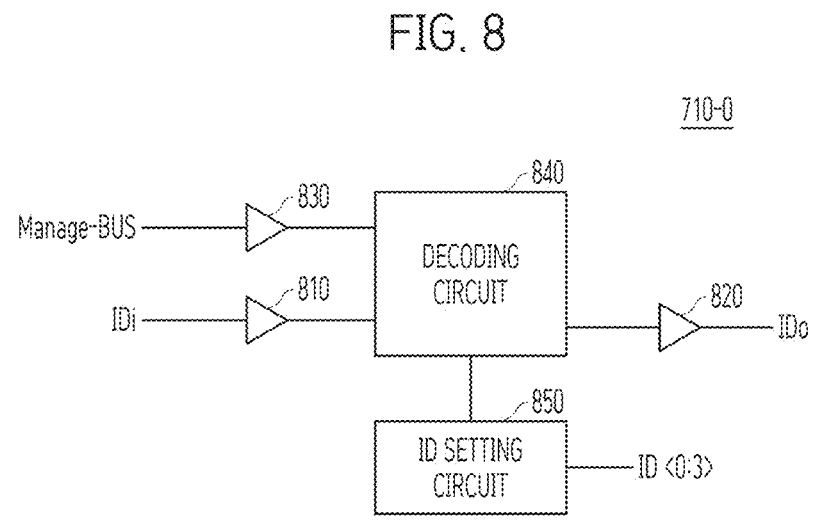

FIG. 8 is a configuration diagram of an embodiment of the memory, such as the memory 710-0 in FIG. 7. FIG. 8 illustrates a configuration related to ID assignment in, for example, the memory 710-0. The other memories 710-1 to 710-7 may be configured in the same way as the memory 710-0.

Referring to FIG. 8, the memory 710-0 includes an ID receiver 810, an ID transmitter 820, a management bus reception circuit 830, a decoding circuit 840, and an ID setting circuit 850.

The ID receiver 810 receives a signal from the ID input terminal Idi.

The management bus reception circuit 830 receive signals from the management bus Manage-BUS. The management bus Manage-BUS includes lines such as a serial clock signal (SCL) line and a serial data signal (SDA) line. The management bus reception circuit 830 may be configured to receive signals on each of the lines included in the management bus Manage-BUS.

The decoding circuit 840 performs an ID setting operation by decoding signals transmitted through the management bus Manage-BUS. When the voltage level of the signal of the ID input terminal Idi received through the ID receiver 810 is an activation level, for example, a ground voltage level, and the ID for the memory 710-0 is not set, the decoding circuit 840 sets an ID by decoding the signals transmitted on the management bus Manage-BUS. After decoding the signal from the management bus Manage-BUS, the decoding circuit 840 outputs the resulting ID to the ID setting circuit 850. The ID setting circuit 850 stores the ID set according to the decoding result received from the decoding circuit 840. In FIG. 8, ID<0:3> indicates IDs set by the ID setting circuit 850 according to instructions from the decoding circuit 840, which ID has four bits, 0 through 3.

After the ID for the memory 710-0 is set, the decoding circuit 840 transmits a signal at an activation level (low level) to the ID transmitter 820 such that a signal at an activation level (ground voltage level), referred to as an activation signal or fixed activation voltage, is output at the ID output terminal Ido by the ID transmitter 820.

Figure 9:
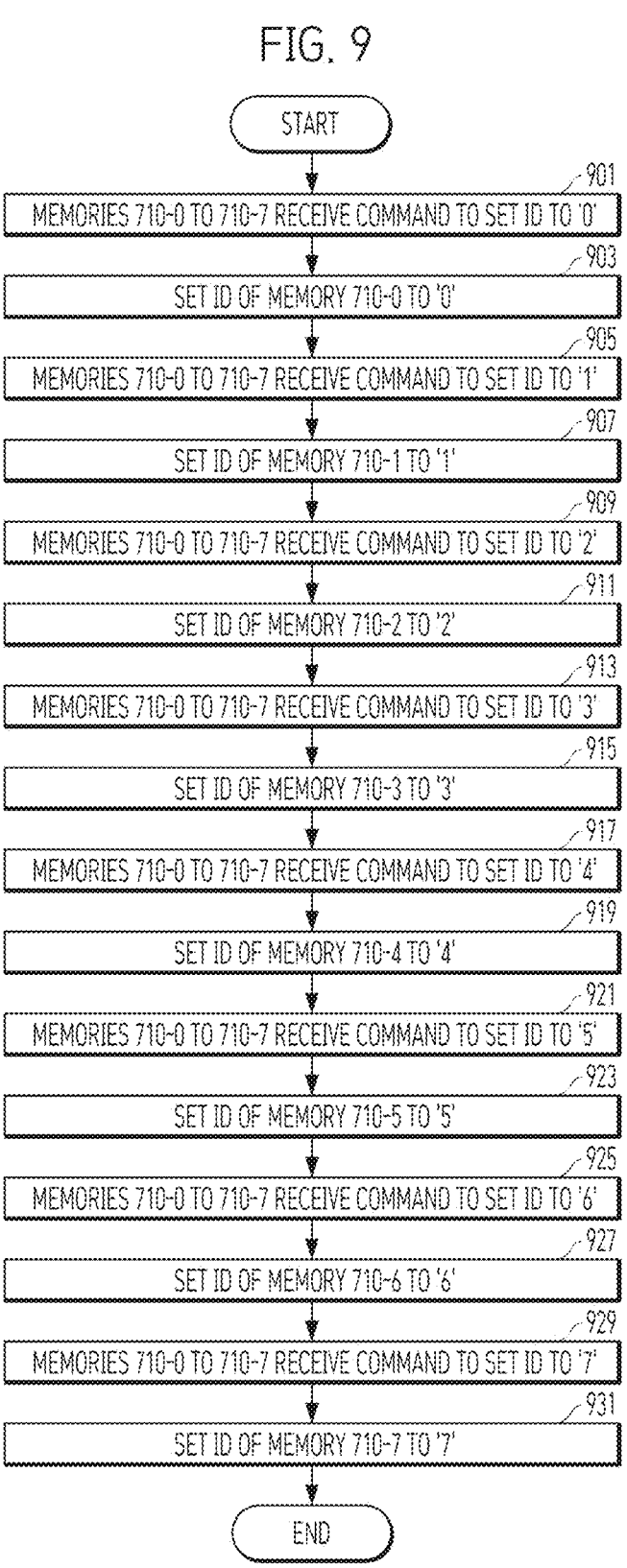
FIG. 9 is a flowchart illustrating a process of setting identifiers of memories of a memory module.

FIG. 9 is a flowchart illustrating a process of setting the IDs of the memories, such as memories 710-0 to 710-7 of the memory module 120 in FIG. 7.

Referring to FIG. 9, the memories 710-0 to 710-7 receive a command to set to "0" an ID transmitted through the management bus Manage-BUS (901). This command is transmitted by the baseboard management controller 130 on the management bus Manage-BUS.

Because an activation level signal is input to the ID input terminal Idi of only the memory 710-0 among the memories 710-0 to 710-7 at this time, the decoding circuit 840 of the memory 710-0 decodes signals transmitted on the management bus Manage-BUS, for example, ID setting information, and, as a result, the ID setting circuit 850 of the memory 710-0 sets the ID ID<0:3> of the memory 710-0 to "0" (903). Because the ID for the memory 710-0 is set, an activation level signal is output from the ID output terminal Ido of the memory 710-0 and is received at the ID input terminal Idi of the memory 710-1.

The memories 710-0 to 710-7 receive a command to set to "1" an ID transmitted through the management bus Manage-BUS (905). This command is transmitted by the baseboard management controller 130 on the management bus Manage-BUS.

Because an activation level signal is input to the ID input terminals Idi of the memories 710-0 and 710-1 among the memories 710-0 to 710-7 at this time, and the ID for the memory 710-0 is set, the decoding circuit 840 of the memory 710-1 decodes signals transmitted on the management bus Manage-BUS, for example, ID setting information, and, as a result, the ID setting circuit 850 of the memory 710-1 sets the ID ID<0:3> of the memory 710-1 to "1" (907). Because the ID for the memory 710-1 is set, an activation level signal is output from the ID output terminal Ido of the memory 710-1 and is received at the ID input terminal Idi of the memory 710-2.

The memories 710-0 to 710-7 receive a command to set to "2" an ID transmitted through the management bus Manage-BUS (909). This command is transmitted by the baseboard management controller 130 on the management bus Manage-BUS.

Because an activation level signal is input to the ID input terminals Idi of the memories 710-0, 710-1, and 710-2 among the memories 710-0 to 710-7 at this time, and the IDs of the memory 710-0 and 710-1 are set, the decoding circuit 840 of the memory 710-2 decodes signals transmitted on the management bus Manage-BUS, for example, ID setting information, and, as a result, the ID setting circuit 850 of the memory 710-2 sets the ID ID<0:3> of the memory 710-2 to "2" (911). Because the ID for the memory 710-2 is set, an activation level signal is output from the ID output terminal Ido of the memory 710-2 and is received at the ID input terminal Idi of the memory 710-3.

Through a similar process as described for setting the IDs of memories 710-0 to 710-2 (901 through 911), the ID for the memory 710-3 is set to "3" (913, 915), the ID for the memory 710-4 is set to "4" (917, 919), the ID for the memory 710-5 is set to "5" (921, 923), the ID for the memory 710-6 is set to "6" (925, 927), and the ID for the memory 710-7 is set to "7" (929, 931).

The memories 710-0 to 710-7 of the memory module 120 in FIG. 7 receive the same commands and ID setting information from the management bus Manage-BUS; only a memory that receives an activation level signal through the ID input terminal Idi and has an unset ID decodes the command from the management bus Manage-BUS, such that each the memories 710-0 to 710-7 can be set to IDs of mutually exclusive or different values. Once the ID is set for a memory among the memories 710-0 to 710-7 that memory does not process ID setting information, for example, the memory does not set a new ID and disregards/does not decode the ID setting information.

Although embodiments according to the technical concepts of the present disclosure are described with reference to the accompanying drawings, the present disclosure is not limited to the above embodiments. Various substitutions, modifications, and changes to the embodiments may be made by those skilled in the art, to which the present disclosure pertains, without departing from the technical concepts of the present disclosure. Therefore, the scope of the present disclosure should not be limited to the foregoing embodiments. All changes within the meaning and range of equivalency of the claims are included within their scope.

What is claimed is:

1. A memory module comprising:

a management bus; and a plurality of memories connected in series and connected to the management bus, each of the plurality of memories including an identification (ID) input terminal and an ID output terminal, wherein among the plurality of memories, a memory, for which an activation signal is applied to an ID input terminal of the memory, sets an ID for the memory in response to signals transmitted on the management bus, and wherein for each of the plurality of memories, a memory does not decode the ID setting information after the ID of the memory is set.

2. The memory module of claim 1, wherein a fixed activation voltage is input to an ID input terminal of a first memory among the plurality of memories connected in series and an activation signal is output by the ID output terminals of each of the plurality of memories after each ID of the plurality of memories is set.

3. The memory module of claim 1, wherein the management bus is connected to a baseboard management controller outside the memory module.

4. The memory module of claim 1, wherein the management bus uses a memory module management control interface.

5. A method for memory identification (ID) allocation, the method comprising:

receiving from a management bus, by a first memory, a second memory, a third memory, and a fourth memory, information to set IDs to a first value;

setting, by the first memory, an ID for the first memory to the first value after an activation signal is input to an ID input terminal of the first memory;

outputting, by the first memory, the activation signal to an ID output terminal of the first memory, wherein the ID output terminal of the first memory is electrically connected to an ID input terminal of the second memory;

receiving from the management bus, by the first memory, the second memory, the third memory, and the fourth memory, information to set the IDs to a second value;

setting, by the second memory having an unset ID, an ID for the second memory to the second value after the activation signal is input to an ID input terminal of the second memory; and outputting, by the second memory, the activation signal to an ID output terminal of the second memory, wherein the ID output terminal of the second memory is electrically connected to an ID input terminal of the third memory.

6. The method of claim 5, further comprising:

receiving from the management bus, by the first memory, the second memory, the third memory, and the fourth memory, information to set the IDs to a third value;

setting, by the third memory having an unset ID, an ID for the third memory to the third value after an activation signal is input to an ID input terminal of the third memory;

outputting, by the third memory, the activation signal to an ID output terminal of the third memory, wherein the ID output terminal of the third memory is electrically connected to an ID input terminal of the fourth memory;

receiving from the management bus, by the first memory, the second memory, the third memory, and the fourth memory, information to set the IDs to a fourth value;

setting, by the fourth memory having an unset ID, an ID for the fourth memory to the fourth value after an activation signal is input to an ID input terminal of the fourth memory; and outputting, by the fourth memory, an activation signal to an ID output terminal of the fourth memory.

7. The method of claim 5, wherein the management bus uses a memory module management control interface.

8. The method of claim 5, wherein a baseboard management controller is connected to the management bus, and the baseboard management controller transmits information to set the IDs to the first memory, the second memory, the third memory, and the fourth memory through the management bus.

9. A memory system comprising:

a command address bus;

a plurality of data buses;

a management bus;

a plurality of memories connected in series, commonly connected to the management bus, commonly connected to the command address bus, and connected to corresponding data buses among the plurality of data buses, and wherein each of the plurality of memories includes an identification (ID) input terminal and an ID output terminal;

a memory controller connected to the plurality of memories through the command address bus and the plurality of data buses; and a baseboard management controller connected to the plurality of memories through the management bus;

wherein an activation signal is input to an ID input terminal of a memory among the plurality of memories, and the memory sets an ID for the memory in response to ID setting information transmitted by the baseboard management controller on the management bus, and wherein for each of the plurality of memories, a memory does not decode the ID setting information after the ID of the memory is set.

10. The memory system of claim 9, wherein a fixed activation voltage is input to an ID input terminal of a first memory among the plurality of memories connected in series and an activation signal is output by the ID output terminal of each of the plurality of memories after each ID of the plurality of memories is set.

11. The memory system of claim 9, wherein the management bus uses a memory module management control interface.

12. A memory module comprising:

a management bus; and a plurality of memories connected to the management bus;

wherein an identification (ID) output terminal of a memory of the plurality of memories is connected to an ID input terminal of a following memory of the plurality of memories such that the plurality of memories are connected in series;

wherein, when an activation signal is applied to an ID input terminal of the memory, the memory sets an ID for the memory in response to ID setting information transmitted on the management bus and provides an output signal to the ID output terminal such that the output signal affects setting an ID for the following memory, and wherein for each of the plurality of memories, a memory does not decode the ID setting information after the ID of the memory is set.

\* \* \* \* \*